(12) United States Patent
Esler

(10) Patent No.: US 6,991,277 B1
(45) Date of Patent: Jan. 31, 2006

(54) INTEGRATED MULTI-FUNCTION TAILGATE

(75) Inventor: Craig E. Esler, Plymouth, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/054,569

(22) Filed: Feb. 9, 2005

(51) Int. Cl.
*B60P 1/26* (2006.01)
(52) U.S. Cl. .................................... 296/50; 296/26.08
(58) Field of Classification Search ................ 296/50, 296/51, 57.1, 26.01, 26.08, 26.09, 26.1
See application file for complete search history.

(56) References Cited

U.S. PATENT DOCUMENTS

| | | | |
|---|---|---|---|
| 4,114,944 A * | 9/1978 | Joynt et al. ................. 296/50 |
| 4,624,619 A * | 11/1986 | Uher .......................... 414/537 |
| 5,050,927 A * | 9/1991 | Montanari .................. 296/165 |
| 5,215,346 A * | 6/1993 | Reitzloff et al. ............ 296/51 |
| 5,248,180 A * | 9/1993 | Hussaini .................... 296/171 |
| 5,468,038 A | 11/1995 | Sauri ......................... 296/57.1 |
| 5,722,711 A * | 3/1998 | German ..................... 296/39.2 |
| 5,752,800 A | 5/1998 | Brincks et al. ............. 414/537 |
| 5,806,907 A | 9/1998 | Martinus et al. .......... 296/26.11 |
| 5,816,638 A | 10/1998 | Pool, III .................... 296/26.11 |
| 5,820,188 A | 10/1998 | Nash .......................... 296/26 |
| 5,857,724 A | 1/1999 | Jarman ....................... 296/26 |
| 5,918,925 A | 7/1999 | Perrin ........................ 296/26 |
| 5,924,753 A | 7/1999 | DiBassie .................... 296/26 |
| 5,975,608 A | 11/1999 | Jarman ....................... 296/26 |
| 6,082,801 A | 7/2000 | Owen et al. ................ 296/26 |
| 6,113,173 A | 9/2000 | Leitner et al. .............. 296/26 |
| 6,116,676 A * | 9/2000 | Edwards .................... 296/64 |
| 6,142,548 A | 11/2000 | Kuhn et al. ................ 296/26 |
| 6,250,702 B1 * | 6/2001 | Eipper ....................... 296/26.1 |
| 6,293,602 B1 | 9/2001 | Presley ...................... 296/26 |
| 6,328,366 B1 * | 12/2001 | Foster et al. ............... 296/37.6 |
| 6,338,519 B2 | 1/2002 | Decker et al. .............. 296/57.1 |
| 6,340,190 B1 | 1/2002 | Rosebrugh et al. ....... 296/26.11 |
| 6,364,392 B1 * | 4/2002 | Meinke ...................... 296/62 |
| 6,378,926 B1 | 4/2002 | Renze et al. ............... 296/26.11 |
| 6,378,927 B1 | 4/2002 | Parry-Jones et al. ...... 296/61 |
| 6,402,215 B1 | 6/2002 | Leitner et al. ............. 296/26.11 |
| 6,422,627 B1 | 7/2002 | Kuhn et al. ................ 296/26.1 |
| 6,422,630 B1 | 7/2002 | Heaviside .................. 296/57.1 |
| 6,454,338 B1 * | 9/2002 | Glickman et al. ......... 296/57.1 |
| 6,502,885 B1 * | 1/2003 | Gammon et al. .......... 296/37.13 |
| 6,609,743 B1 | 8/2003 | Stevenson ................. 296/26.11 |
| 6,641,190 B2 | 11/2003 | Kirchhoff .................. 296/26.11 |
| 6,676,182 B2 | 1/2004 | Fitts .......................... 296/26.11 |
| 6,698,810 B1 * | 3/2004 | Lane .......................... 296/3 |
| 6,742,822 B2 | 6/2004 | Vejnar ....................... 296/26.11 |

* cited by examiner

*Primary Examiner*—H. Gutman
(74) *Attorney, Agent, or Firm*—Gifford, Krass, Groh, Sprinkle, Anderson & Citkowski, PC

(57) ABSTRACT

A vehicle tailgate extension apparatus comprises a tailgate extender, having a stowed position in which the tailgate extender is located within a space within the tailgate, and a deployed position in which an exposed portion of the tailgate extender protrudes out of the tailgate space, a motor, and a gear drive assembly coupling the motor to the tailgate extender. The motor and gear drive assembly can be located within the tailgate space.

15 Claims, 5 Drawing Sheets

INTEGRATED MULTI-FUNCTION TAILGATE

FIELD OF THE INVENTION

The invention relates to vehicle tailgates, in particular to tailgate extenders.

BACKGROUND OF THE INVENTION

Load carrying vehicles, such as trucks, often have fold-down tailgates. Folded down, the tailgate extends the area of the truck bed. The tailgate can as such be used as an additional horizontal support surface for items within the truck bed. For example, when the truck is stationary, the tailgate can be used as a support for food items or a beverage.

However, a folded-down tailgate provides a restricted surface area. If trying to carry a long item in the bed of a truck, the item may extend out of the bed area and beyond that of a folded-down tailgate, which creates a hazard for following traffic.

U.S. Pat. No. 5,468,038 to Sauri describes a multiple configuration tailgate extender. However, Sauri fails to disclose a motor-driven tailgate extender.

U.S. Pat. No. 5,924,753 to DiBassie describes a pickup truck bed extender. However, this device requires the operator to make adjustments in order to fit an aftermarket type framework within an existing vehicle. Hence, this fails to provide a convenient method of tailgate extension for a vehicle.

Japanese Patent JP11157390 discloses a vehicle having a plate which is extended at an angle to provide a loading ramp. Japanese Laid-Open Publication No. HEI 7-36826 discloses a tailgate extender which folds outwardly from the tailgate to provide a ramp. However, the prior art fails to disclose a tailgate having an integral tailgate extension which moves telescopingly powered by a motor, which may then be used in a number of positions.

SUMMARY OF THE INVENTION

A vehicle tailgate extension apparatus comprises a tailgate extender having a stowed position and one or more deployed positions. In the stowed position, substantially all of the tailgate extender is located within a space within the tailgate. In a deployed position, an exposed portion of the tailgate extender protrudes out of the tailgate to provide an extension to the tailgate. A motor can be used to move the tailgate between stowed and deployed positions. The motor and an associated gear drive assembly can be located within the tailgate.

Substantially all of the tailgate extender can be located within the tailgate space when the tailgate extender is in a stowed position. The tailgate extender may include an end portion, shaped so as to provide an upper surface to the tailgate when the tailgate is in an upright position. The end portion is located at the distal end of the tailgate extender as the tailgate is deployed. For example, the tailgate extender may be less than the width of the tailgate to fit within tailgate side walls which interconnecting the inner and outer walls, however an end portion can be the full width of the tailgate, or optionally wider than the body of the tailgate, to present a continuous smooth upper surface when the tailgate extender is in the stowed position.

The tailgate may have an oblique configuration, in which the tailgate and tailgate extender are angled towards the ground, the tailgate and the exposed portion of the tailgate extender cooperatively forming a ramp.

The tailgate extender may have a plurality of deployed positions, so that the exposed portion of the tailgate extender has a variable extent. The extension (or size of the exposed portion) may be continuously varied using the motor, for example allowing a ramp configuration to extend so as to just reach the ground. If the tailgate is upright, the extension may be adjusted to provide attachment hardware (such as a hook, loop, hole, or other mechanical structure) at a desired height. Attachment hardware can be provided at a distal end of the exposed portion of the tailgate extender, or proximate to the distal end, allowing tall articles to be conveniently secured to the tailgate extender.

The apparatus the tailgate extender may further comprises a fold-out portion, folding out from the exposed portion so as to further extend the tailgate. The tailgate extender may be provided with a cut-out so to accommodate the motor and/or a gear assembly.

The motor can be coupled to the tailgate extender through a gear drive assembly located within the tailgate space. Alternatively, the drive shaft of the motor may directly drive the tailgate extender. A gear drive assembly may include a ball screw.

DETAILED DESCRIPTION OF THE INVENTION

A typical vehicle tailgate has an inner wall and an outer wall made of sheet metal. In the case of a pick-up truck with a drop-down tailgate, the tailgate has an upright position in which the inner wall forms part of the enclosure of the pick-up bed. The inner wall and outer wall enclose a tailgate space within the tailgate. In a conventional tailgate, this space will be left empty. However, in an improved tailgate according to an example of the present invention, a tailgate extender is stowed in the tailgate space, such that substantially all of the tailgate extender is enclosed in the tailgate space. The tailgate extender is then deployed using a motor-driven gear assembly to a deployed position, in which an exposed portion of the tailgate extender protrudes out of the tailgate space. The exposed portion provides the tailgate extension, as it provides additional surface area to the tailgate.

If the tailgate is in a horizontal position, parallel to the ground, the tailgate extender provides an additional support surface, which can be used, for example, to support tools, food, and the like. Additionally, the tailgate extender can provide a longer bed, for example to support long items within the bed of a truck.

If the tailgate is in an upright (vertical) position, the conventional tailgate closed position, the tailgate extender extends upwards and provides a height extension to the tailgate. The upper edge of the tailgate extender can be provided with attachment hardware, for example to allow long freight items to be supported at one end by the cab of the vehicle, and at the other end by the raised tailgate extender.

The tailgate may also have a downwardly sloping oblique position, in which the exposed portion of the tailgate extender presents a ramp from the ground.

Hence, the tailgate extender can be used as a ramp to load heavy cargo, to extend outwardly in a horizontal orientation so as to be used as a workbench or bed extension for longer objects within the truck bed, or be extended in an upwards or vertical configuration so as to help keep tall objects or cargo secured in the bed.

Examples of the present invention facilitate loading of large and heavy cargo, the securing of tall objects to an extended rear tailgate, and the securing of long objects which may rest on an extended tailgate and the truck cab. Examples of the present invention allow a user to quickly adjust the tailgate to load or secure an object in the truck bed, without having to install additional parts.

The tailgate extender may have an end portion that forms the top (or end piece) of an upright tailgate when the tailgate extender is stowed. The exposed edge may comprise rounded metal, plastic, and/or rubber pieces so as to present a visually pleasing appearance, and to avoid hazardous sharp edges.

Figure 1:
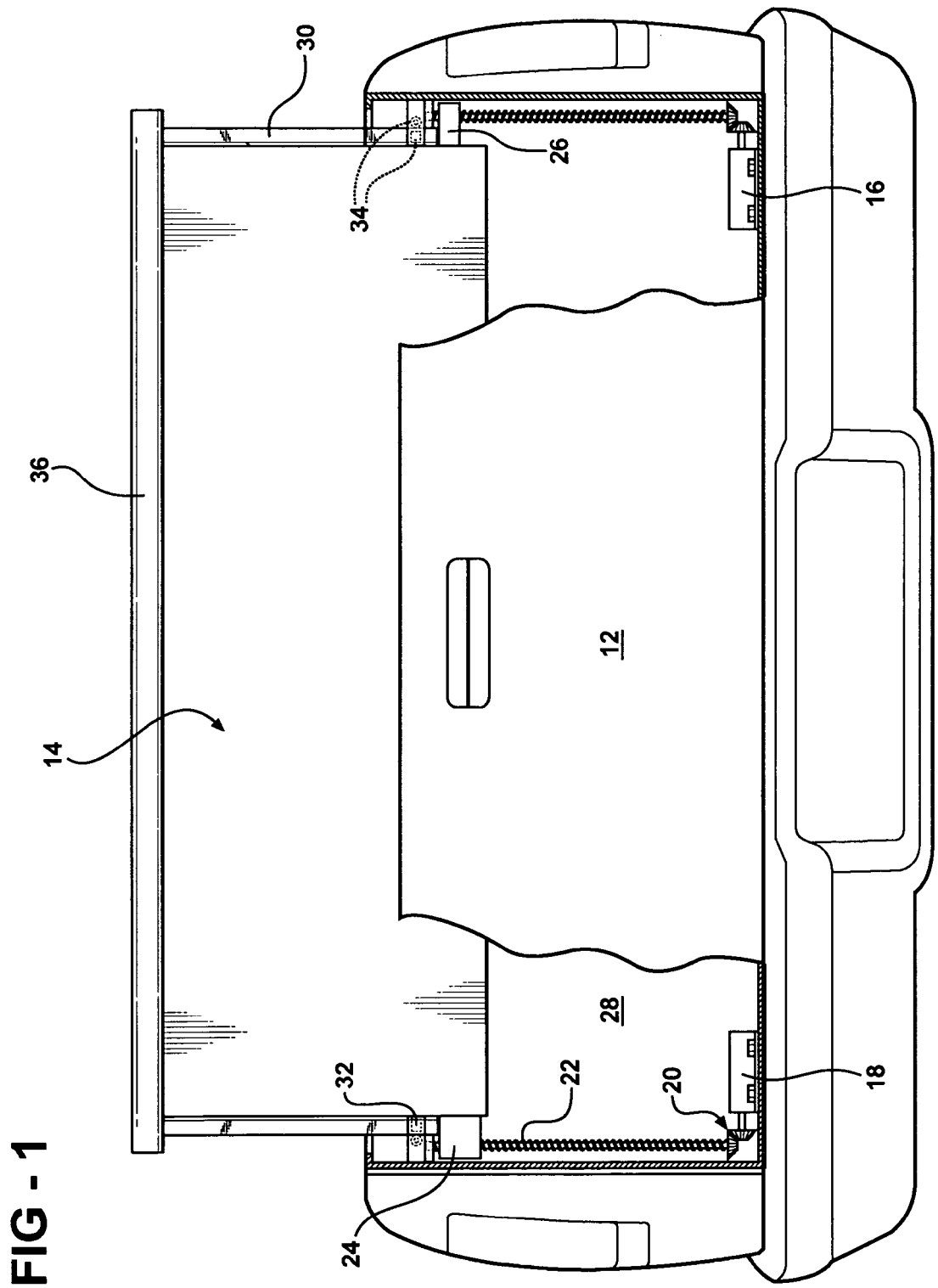
FIG. 1 shows a rear view of a truck having a fold-down tailgate, the tailgate being in an upright position with a tailgate extender partially extending from the tailgate.

FIG. 1 shows a rear view of a truck having a drop-down tailgate, the tailgate having an outer wall 12 and an opposed inner wall. The inner wall is not visible from this rear view of the truck, and faces the truck bed when the tailgate is in an upright configuration as shown.

The inner and outer walls of the tailgate 10 enclose a tailgate space in which the tailgate extender 14 is partially located. When not in use, the tailgate extender 14 can be entirely enclosed between the inner and outer walls of the tailgate. The end portion 36 of the tailgate extender 14 can be shaped so as to match the side profiles of the truck bed.

A cutaway, for illustrative purposes only, in the outer wall 12 reveals a drive motor 18, gear assembly 20, ball screw 22, first nut 24, and first bearing block 26. The inner wall 28 is revealed by the cutaway. The motor 18, preferably an electric motor having a brake, drives the ball screw 22 through the gear assembly 20. As the ball screw rotates 22 through the nut 24, this operates so as to drive the tailgate extender 14 in an upward direction, in the illustrated configuration.

The tailgate extender may be provided with additional guides and an end stop. Towards the right-hand side of the tailgate, as illustrated in FIG. 1, a second cutaway (for illustrative purposes only) in the outer wall 12 reveals a second drive motor 16, and second nut 26. A guide rail 30 is provided on one side of the tailgate extender, the guide rail running through second bearing block 34. A similar guide rail on the left side of the tailgate extender runs through the first bearing block 26.

In this example, the end portion of the tailgate extender forms an end piece of the tailgate when the tailgate extender is in the stowed configuration. In other examples, the end portion of the tailgate extender may be concealed when the tailgate extender is stowed, for example by a flap or hinged end piece of the tailgate.

In other examples, only one drive motor is used. The drive motor may be at one side of the tailgate extender, or may be centrally located.

The tailgate extender may have one or more cut-outs to accommodate the drive motor. For example, referring to FIG. 1, the lower left hand side of the tailgate extender may have a rectangular cut-out shaped so as to accommodate drive motor 18. A second cut-out can be provided to accommodate the second drive motor 16.

Figure 2:
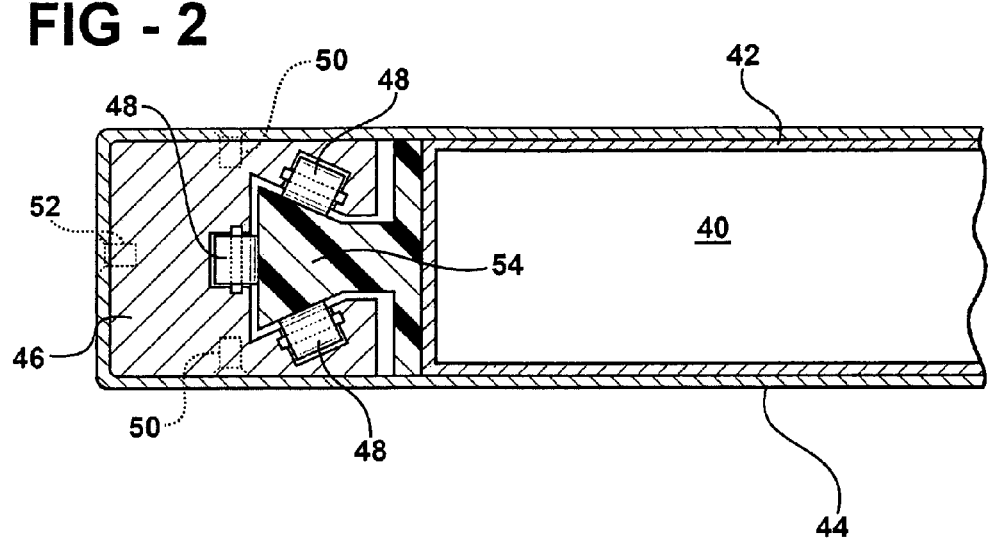
FIG. 2 shows a cross section of part of a tailgate, showing an included tailgate extender having a guide rail.

FIG. 2 shows a cross section through a portion of a tailgate with tailgate extender, illustrating operation of a guide rail. In this example, the tailgate extender is shown located between an inner tailgate wall and an outer tailgate wall, in this case both walls and an interconnecting tailgate side wall being formed by continuous metal sheet 44. The tailgate extender comprises a metal sheet 42, enclosing a central volume 40, and a guide rail 54 attached to the metal sheet 42. The guide rail moves through a guide rail receiver formed within bearing block 46. A number of bearings, such as bearings 48, are provided so as to assist a smooth relative motion of the tailgate extender through the bearing block. Screws such as 50 and 52 are provided to secure the bearing block 46 to the tailgate wall, the screw 52 securing to the side wall, and the screws 50 attaching to inner and outer walls.

In other examples, the bearings may be ball bearings, or may be omitted. For example, the guide rail receiver may comprise a channel along which the guide rail can slide, which may optionally be lubricated. Screws, latches, pins, or other hardware can also be provided to secure the tailgate extender in any desired position. The central volume 40 can be air filled, or filled with, for example, foam.

Figure 3:
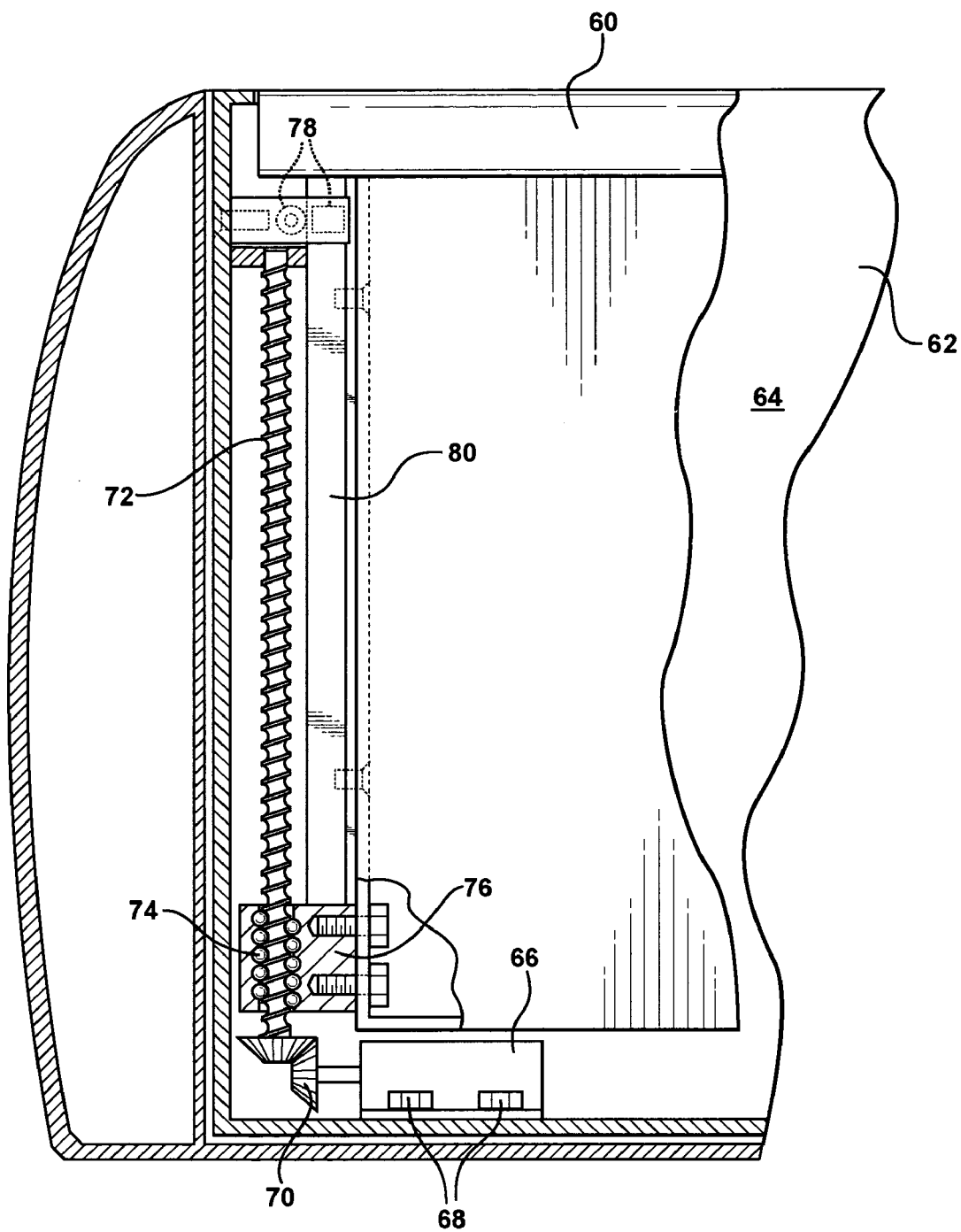
FIG. 3 shows a rear view of part of a truck, the outer tailgate wall being cut away to show details of a possible motor drive mechanism.

FIG. 3 shows an end view of a portion of a tailgate according to the present invention, having a motor-driven tailgate extender located within the tailgate space. The figure shows a tailgate extender having an end portion 60 aligned with the top of a tailgate 62. A cutaway in the outer wall of the tailgate (for illustrative purposes only) reveals a tailgate space 64 enclosing drive motor 66, motor mounting screws 68, gear assembly 70, ball screw 72, nut 76 including nut bearings such as ball bearing 74, bearing block (enclosing bearings, shown dashed) 78, and guide rail 80. The bearing block acts as a guide rail receiver.

As the drive motor 66 turns the gear assembly 70, this rotates the ball screw 72, which in turn tends to drive the nut 76 upwardly so as to drive the tailgate extender outwards from the tailgate space between the inner and outer walls of the tailgate.

Figure 4:
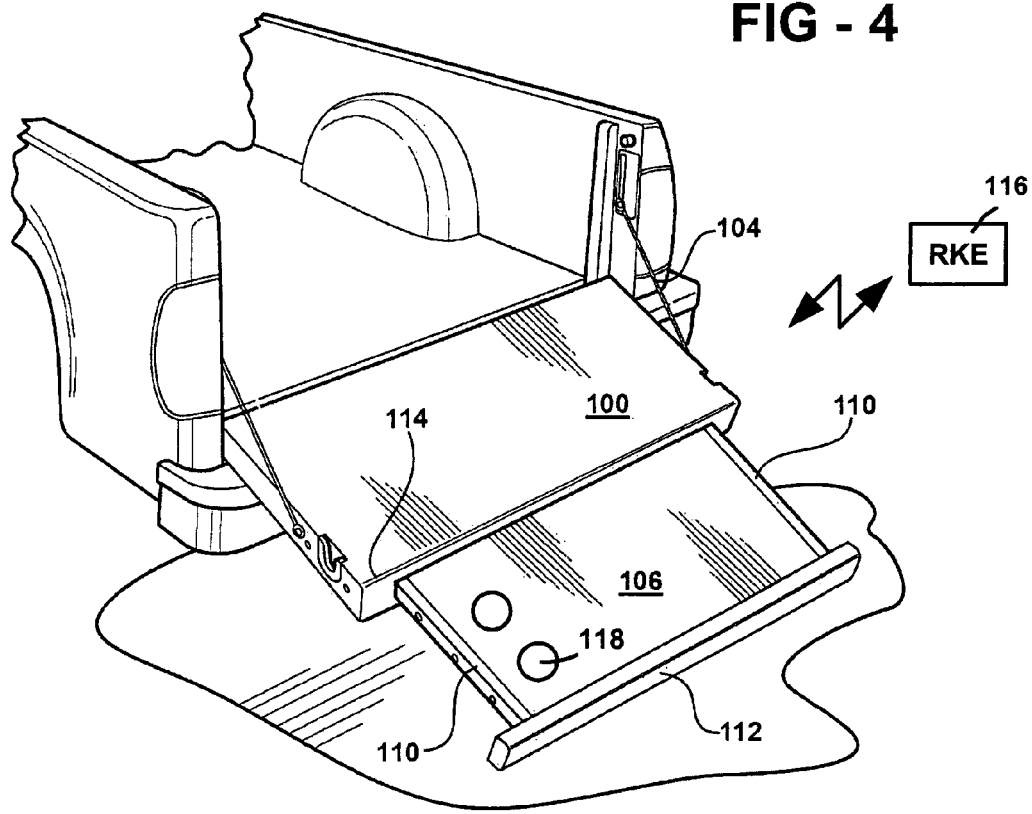
FIG. 4 shows part of the rear of a truck, the tailgate being folded down into an angled downward position secured by a cable, with a tailgate extender extending rearwardly from the tailgate.

FIG. 4 illustrates a rear portion of a truck, the truck having a fold-down tailgate 100 with cable 104 attached to adjustable cable stay located within the body of the truck. The orientation of the tailgate can be adjusted by the length of the cable 104, or through movement of the cable stay within an elongated receptor. The tailgate extender 106 is shown in a deployed configuration, protruding outwards from the tailgate 100. The tailgate extender 106 has guide rails 110 which pass through bearing blocks (not shown) within the tailgate. The end portion 112 of the tailgate extender 106 rests against the end surface 114 of the tailgate when the tailgate extender is retracted back into the tailgate, in the stowed configuration. The figure also shows a remote keyless entry device (RKE) 116 used for remote control of the tailgate, as indicated by the jagged arrowed line, and circular depressions such as circular depression 118, sized to accept a beverage container in the upper surface of the tailgate extender.

As shown the tailgate is in an angled downward position and the tailgate extender extends outwards also in an angled downward position. The orientation of the tailgate can be adjusted using the cable stays, so as to provide a ramp for loading objects into the bed of the truck. Also, the extended portion of the tailgate extender may be hingedly attached to a portion within the tailgate so as to fold down onto the ground and provide a ramp for loading the truck.

Figure 5:
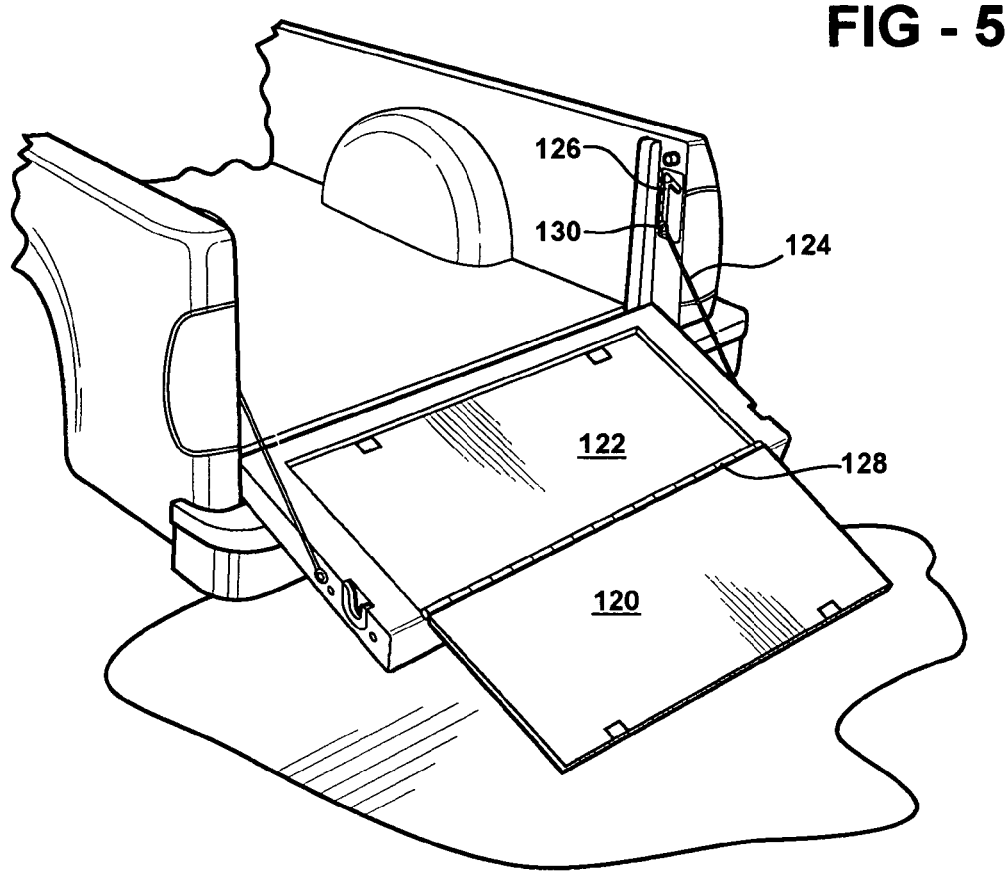
FIG. 5 shows a fold-out tailgate with tailgate extender secured by cable stays.

FIG. 5 shows another example, in this case a tailgate having a fold-out tailgate extender. Tailgate extender 120 is hingedly attached to the tailgate by hinge 128, located proximate to the end of tailgate. The inner wall 122 of the tailgate is shaped so as to receive the tailgate extender and provide a substantially smooth profile to the truck bed when the tailgate extender is stowed (in this example folded in to the tailgate). The orientation of the tailgate can be adjusted using the cable 124, and adjustable cable stay 130. The position of the cable stay can be adjusted within a shaped cable stay receiver 130. The cable stay receiver 126 is in the form of a slot, in this case an inverted J shape.

The cable stay receiver may have a plurality of adjustment notches into which the cable stay may be positioned so as to provide a number of possible orientations for the tailgate.

In other examples, the orientation of the tailgate can be controlled by adjusting the length of the cable 124. This may be achieved electrically, by providing one (or two) motor driven reels within the tailgate, or located within one or both sides of the truck. As the cable is shortened, the tailgate will tend to adopt a vertical position. In other examples the length of the cable may be adjusted by hand, for example through a hand crank rotating a reel either within the tailgate, or within a space within the side of the truck.

A multi-position cable stay can be provided by adding a notch system allowing choice of the angle of the tailgate. For example, a lever can be provided that when pulled releases the stay for the current notch and allows a user to choose the tailgate angle. Once the lever is released the cable stay would snap into the nearest notch. Moving the stay on the truck bed could also be accomplished using a crank and motor along with a ball screw or jack screw. Hence, the tailgate angle can be increased and so allowing the tailgate with deployed extender to be used together as an access ramp.

Another method of adding a multi-position cable stay to the tailgate can be accomplished by adding a notch system that allows a user to choose the tailgate angle. A multi-position adjustment of the tailgate pivot point can also be provided. This can be accomplished by turning a jack or ball screw by crank or motor so as to raise or lower the tailgate pivot point. The cranks or motors could be located in the truck bed wall or in the tailgate.

The cable length can also be adjustable using reels that wind up or let out cable. The reels can be turned by motor, or the use of a spring and lever system. The motor for adjusting the cable length can be automated, remotely controlled, manually controlled, or otherwise controlled. This allows the tailgate angle to be increased, for example making the tailgate angled obliquely downwards towards the ground, and allowing the tailgate and deployed tailgate extender to function together as an access ramp. Both tailgate angle and extender deployment may be controlled from the vehicle cab.

Figure 6:
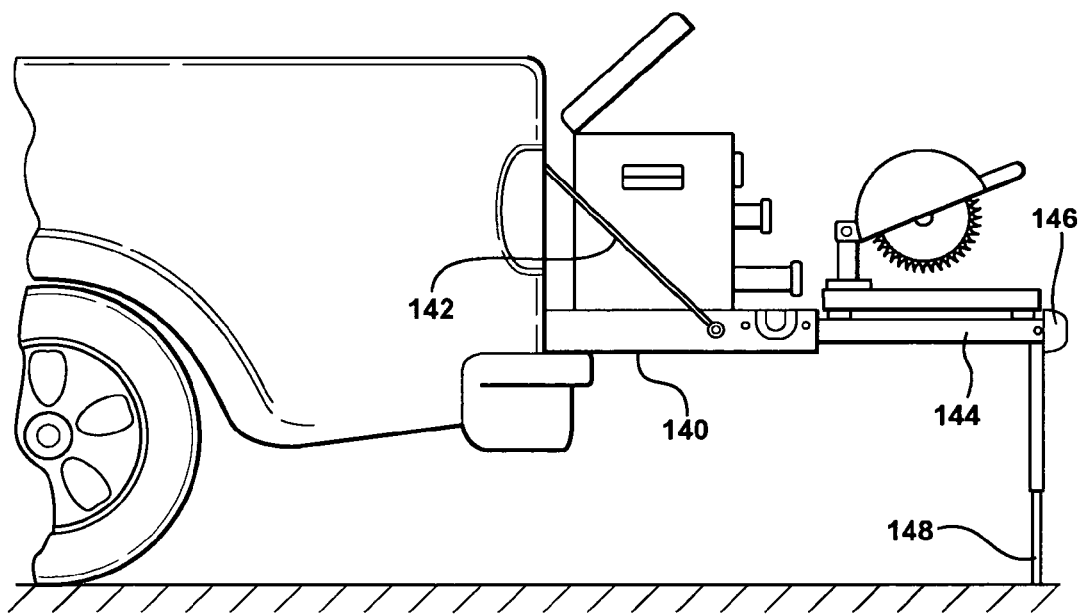
FIG. 6 shows a side view of a tailgate extender being used as a surface for various items.

FIG. 6 is a side view illustrating the tailgate extender being used as a support surface for a number of items. This side view shows tailgate 140 in a substantially horizontal position, cable 142, tailgate extender 144, an end portion of the tailgate extender 146, and a pivotally connected leg 148. The pivotally connected leg is stowed alongside the tailgate extender within the tailgate. When fully extended, the leg can be swung down so as to further support the tailgate extender. In this example, the leg is telescopically extendable so as to reach the ground.

In other examples a portion or portions of the tailgate extender can be deployed so as to provide a guard rail or posts (for example, to support webbing or the like) along the rear portion of the tailgate extender.

Figure 7:
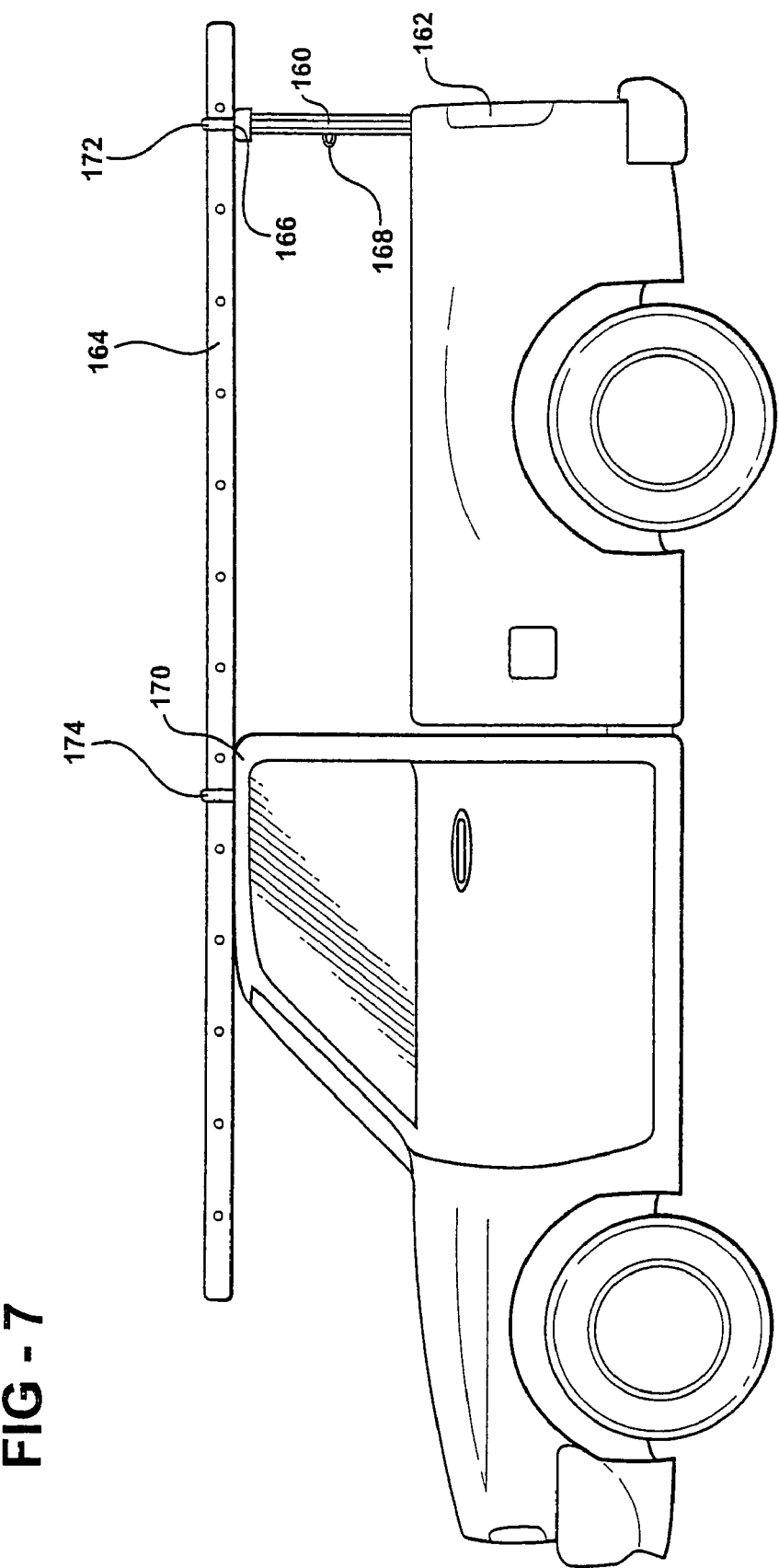
FIG. 7 shows a tailgate extender in a vertical configuration, the upper end of the tailgate extender being used to secure cargo carried by the truck.

FIG. 7 is a side view of a truck, the tailgate being closed so that the tailgate extender 160 extends upwardly. The tailgate is not visible as it is obscured by a side portion 162 of the side of the truck. The end portion of the tailgate extender 166 is provided with a surface suitable for the resting of cargo 164 thereon. The cargo 164, in this example a ladder, is supported by the end region 166 and also a portion of the truck cab at 170. The end portion 166 of the tailgate extender is provided with an attachment hardware 172 (in this example, a clip) to secure the cargo 164. The cab roof 170 is also provided with attachment hardware 174, also a clip in this example.

The tailgate extender is also provided with attachment hardware 168, in the form of a hook, provided so as to allow securing of, for example, tall cargo within the truck bed to the tailgate extender. The attachment hardware may be recessed within the tailgate extender, or recess by, for example, folding, to allow stowage of the tailgate extender within the tailgate space.

Attachment hardware can include one or more clips, hooks, straps, magnets, bolts, and the like. The end portion of the tailgate extender can further be provided with a rubberized surface, a plurality of attachment hardware items, guide structures such as indentations, or other surface or structure suitable for support of long cargo such as a ladder.

The portion of the cab 170 on which the cargo 164 rests may be in the form of a rack, or similar structure to that of the end region 166. For example, the portion 170 may be a rubberized surface, comprising a plurality of attachment hardware items, or other structure.

Control of Tailgate Extender

A controller in the cab of the vehicle may transmit control signals to the tailgate extender, allowing it to be deployed by a vehicle operator. For example, the controller may send a signals to the tailgate which cause the tailgate to unlock, to swing down through rotation of a cable drum, and the tailgate extender to deploy, for example to provide a ramp.

The tailgate extender may be driven by a servomotor, or other motor configuration. One or more motors can be used. A hand crank or other manually operated drive mechanism can be used in place of the motor to move the tailgate extender between stowed and deployed positions. The motor can also be located within the vehicle body proximate to the tailgate, with a drive shaft coupling the motor to the tailgate extender.

In other examples, the tailgate extender is controlled by operator controls on or proximate to the tailgate. These may include switches, buttons, and the like, which can only be conveniently operated when the vehicle is stopped.

A proximity sensor and/or a motion sensor, such as a radar, IR, visual, ultrasound, or other sensor, may be used to prevent deployment of the tailgate extender if other objects would be at risk of contact by the tailgate extender on deployment.

The tailgate extender may comprise one or more mechanical locks to prevent motion (either deployment or retraction to the stowed position) of the tailgate extender. Locks may be provided by pins, bolts, screws, and the like. No motor activity may be allowed when the vehicle is in motion, or if a sensor (such as a pressure sensor or proximity sensor) detects an object on, proximate to, or secured to the tailgate extender.

Remote control may also be provided. For example, a RKE (Remote Keyless Entry) transmitter system could be used to energize the motor so as to deploy the tailgate extender. A key fob may be provided with a separate button for deployment of the tailgate extender, or a combination of existing buttons, holding down a button for a predetermined time, or predetermined button operation sequence used to deploy or retract the tailgate extender.

Configuration of Tailgate Extender

A tailgate extender may be a substantially rectangular object. It may be solid, possibly unitary construction of plastic or metal. The tailgate extender may alternatively comprise spaced apart substantially parallel walls, for example with an interior air space or other space.

The upper surface of the tailgate extender (with the tailgate in a horizontal configuration) may be shaped to facilitate anticipated uses. For example, the surface may have a plurality of circular depressions sized to accept beverage containers or food receptacles. For example, the upper surface may include one or more of the following features: hardware for attachment of a grill stand, a non-slip treatment, a fold-up rack for temporary storage of tools, a fold up spindle for acceptance of a roll (such as cable or hosing), threaded holes for securing items, a fold out rack, and the like.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, we claim:

1. An apparatus providing a tailgate extension for a tailgate of a vehicle, the tailgate having a tailgate space located therein, the apparatus comprising:
    a tailgate extender, having a stowed position in which the tailgate extender is located within the tailgate space, and a deployed position in which an exposed portion of the tailgate extender protrudes out of the tailgate space; and
    a motor, mechanically coupled to the tailgate extender, the motor operational to move the tailgate extender between the stowed position and the deployed position,
    wherein the motor is coupled to the tailgate extender through a gear drive assembly located within the tailgate space.

2. The apparatus of claim 1, wherein substantially all of the tailgate extender is located within the tailgate space when the tailgate extender is in the stowed position.

3. The apparatus of claim 1, wherein the tailgate extender has a plurality of deployed positions.

4. The apparatus of claim 1, wherein the motor is located within the tailgate space.

5. The apparatus of claim 1, the tailgate extender further including attachment hardware, the attachment hardware allowing cargo to be secured to the tailgate extender.

6. The apparatus of claim 5, wherein the attachment hardware is located on an end portion of the tailgate extender.

7. The apparatus of claim 1, wherein the tailgate has a horizontal configuration, in which the tailgate extender provides a horizontal support surface.

8. The apparatus of claim 1, wherein the tailgate has an oblique configuration, in which the tailgate extender and tailgate cooperatively provide a ramp.

9. An apparatus providing a tailgate extension for a tailgate of a vehicle, the tailgate having a tailgate space located therein, the apparatus comprising:
    a tailgate extender, having a stowed position in which the tailgate extender is located within the tailgate space, and a deployed position in which an exposed portion of the tailgate extender protrudes out of the tailgate space; and
    a motor, mechanically coupled to the tailgate extender through a gear drive assembly, the motor operational to move the tailgate extender between the stowed position and the deployed position,
    wherein the gear drive assembly includes a ball screw.

10. An apparatus providing a tailgate extension for a tailgate of a vehicle, the tailgate having a tailgate space located therein, the apparatus comprising:
    a tailgate extender, having a stowed position in which the tailgate extender is located within the tailgate space, and a deployed position in which an exposed portion of the tailgate extender protrudes out of the tailgate space; and
    a motor, mechanically coupled to the tailgate extender, the motor operational to move the tailgate extender between the stowed position and the deployed position,
    wherein the tailgate extender is substantially rectangular, having a first side and a second side, a guide rail being provided proximate to the first side, the guide rail passing through a bearing block within the tailgate space.

11. An apparatus providing a tailgate extension for a tailgate of a vehicle, the tailgate being a drop-down tailgate having an upright position and a horizontal position, the tailgate in the upright position having a hinged lower edge and an upper edge, the apparatus comprising:
    a tailgate extender, having a substantially rectangular shape;
    a gear drive assembly, coupled to the tailgate extender; and
    a motor, coupled to the gear drive assembly, operation of the motor moving the tailgate extender between a stowed position and a deployed position,
    the motor and gear drive assembly being located within the tailgate,
    the tailgate extender being substantially enclosed within the tailgate when in the stowed position, and
    the tailgate extender having an exposed portion protruding from the upper edge of the tailgate when in the deployed position,
    wherein the tailgate extender can be moved between the stowed position and the deployed position by operation of a vehicular remote keyless entry device.

12. The apparatus of claim 11, wherein the tailgate extender has an exposed portion protruding from the upper edge of the tailgate when in the deployed position.

13. The apparatus of claim 12, wherein the exposed portion supports attachment hardware, the attachment hardware allowing cargo to be secured to the tailgate extender.

14. The apparatus of claim 11, wherein the tailgate extender has an upper surface when the tailgate is in the horizontal position, the upper surface having a plurality of circular depressions sized to accept beverage containers.

15. The apparatus of claim 11, wherein the tailgate further has a downwardly angled configuration, the tailgate and tailgate extender cooperatively providing a ramp from the ground when the tailgate is in the downwardly angled configuration and the tailgate extender is in the deployed configuration.

* * * * *